(12) United States Patent
Owen

(10) Patent No.: US 10,976,259 B2
(45) Date of Patent: Apr. 13, 2021

(54) RAMAN IMMERSION PROBE SYSTEMS AND METHODS

(71) Applicant: Harry Owen, Franklin, MI (US)

(72) Inventor: Harry Owen, Franklin, MI (US)

( * ) Notice: Subject to any disclaimer, the term of this patent is extended or adjusted under 35 U.S.C. 154(b) by 0 days.

(21) Appl. No.: 16/595,949

(22) Filed: Oct. 8, 2019

(65) Prior Publication Data
US 2020/0116639 A1  Apr. 16, 2020

Related U.S. Application Data

(60) Provisional application No. 62/744,839, filed on Oct. 12, 2018.

(51) Int. Cl.
*G01J 3/44* (2006.01)
*G01N 21/65* (2006.01)

(52) U.S. Cl.
CPC ... *G01N 21/65* (2013.01); *G01N 2201/06113* (2013.01); *G01N 2201/0846* (2013.01)

(58) Field of Classification Search
CPC ... A61B 5/0066; A61B 5/0071; A61B 5/0075; G01J 3/44; G01N 21/65; G01N 21/64; G01N 21/00
See application file for complete search history.

(56) References Cited

U.S. PATENT DOCUMENTS 6,118,520 A * 9/2000 Harner ............... G01N 21/8507
                                                  356/136

* cited by examiner

*Primary Examiner* — Abdullahi Nur
(74) *Attorney, Agent, or Firm* — The Law Offices of John G. Posa

(57) ABSTRACT

Immersion Raman probes use collimated light as opposed to a diverging fiber bundle or lens-based focusing geometry to deliver and collect light to and from a sample, thereby eliminating problems associated with chromatic aberration. The probes convey counter-propagating excitation and collection beams to and from a distally sealed, signal-transmissive optical component such as a window immersed, in contact with, or otherwise exposed to a sample volume. The counter-propagating excitation and collection beams pass directly through the sealed optical component and into the sample volume in collimated form for Raman analysis thereof. The probe may further include a baffled sample chamber coupled to the distal end of the probe optic body, with one or more optical elements to reflect the counter-propagating beams. The sample chamber may be fixed or axially movable to facilitate path length adjustment. The invention finds utility in process Raman, microscopy and other applications.

18 Claims, 5 Drawing Sheets

FIG. 4
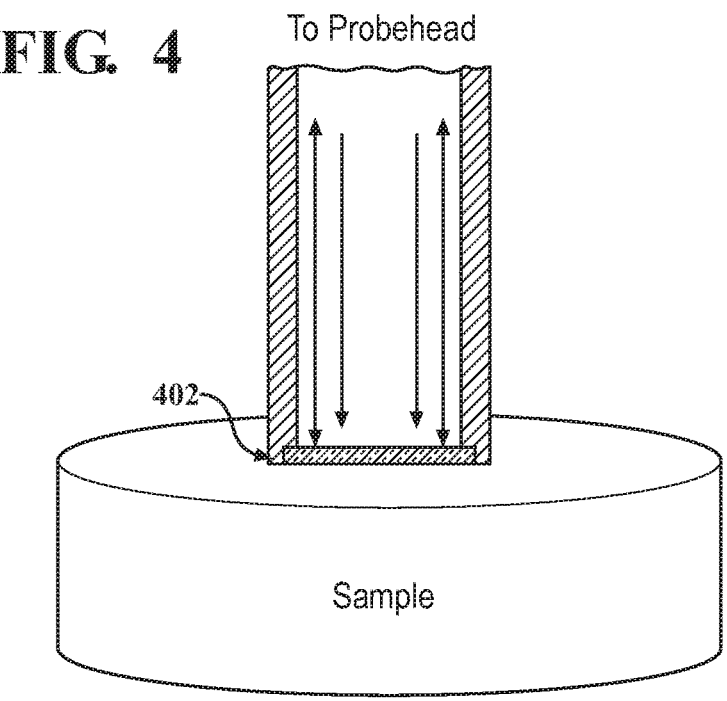
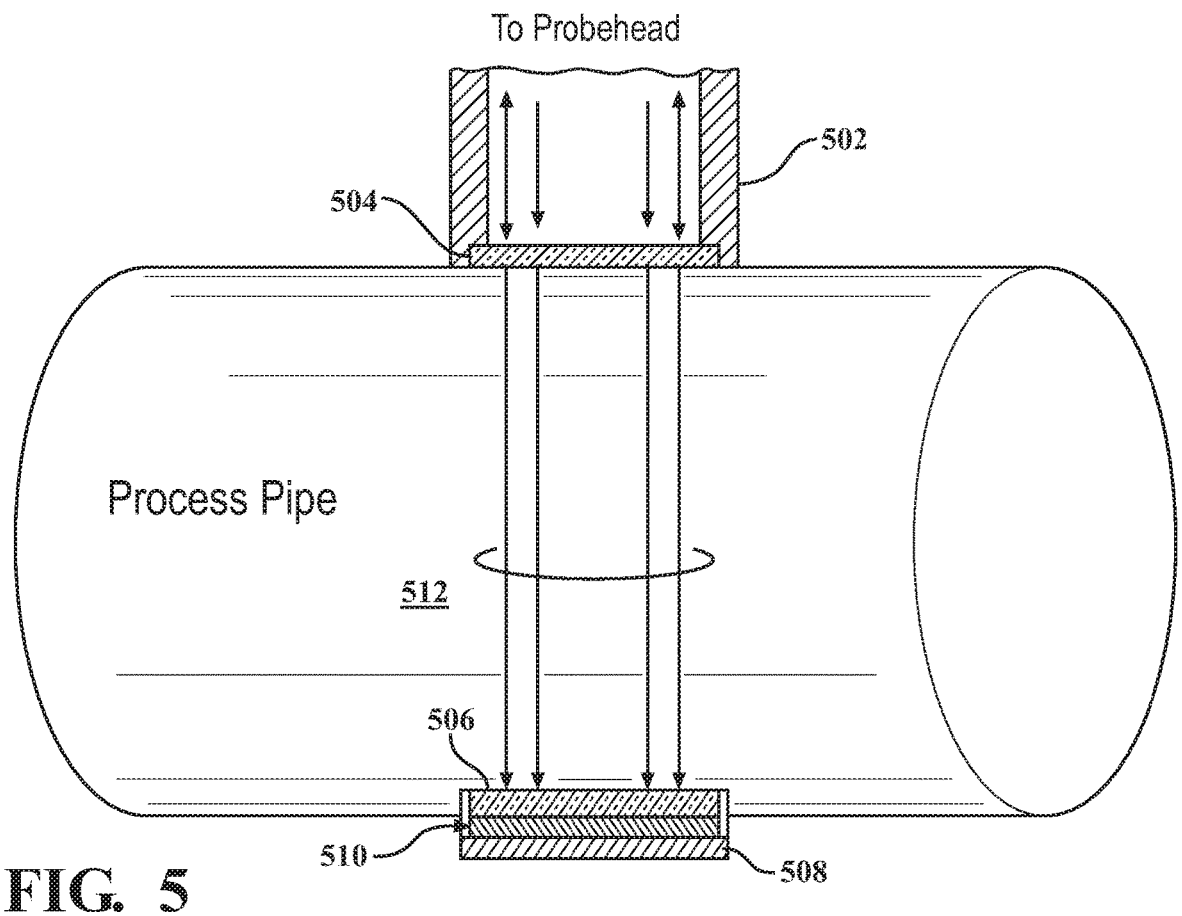
FIG. 5

RAMAN IMMERSION PROBE SYSTEMS AND METHODS

REFERENCE TO RELATED APPLICATIONS

This application claims priority to, and the benefit of, U.S. Provisional Patent Application Ser. No. 62/744,839, filed Oct. 12, 2018, the entire content of which is incorporated herein by reference.

FIELD OF THE INVENTION

This invention relates generally to Raman spectroscopy and, in particular, to Raman immersion probes that can be used to analyze a full range of sample types including gases, liquids, slurries and solids.

BACKGROUND OF THE INVENTION

Most existing, commercially available Raman probes are based on a lens-based focused geometry that require selecting the correct focal length for the type of sample undergoing evaluation. As shown in FIG. 1A, clear liquids allow for long focal lengths within a sample, though particulates and bubbles may reduce throughput and degrade signal to noise. One solution, illustrated in FIG. 1B, involves optically moving the focal point and depth of field closer to the distal end of the probe. Despite the improvement, problems remain with slurries and solids. A further solution, shown in FIG. 1C, involves the use of a ball lens, for example, to facilitate focusing directly on the face (tangent) to the distal tip of the optic. Although distance, depth of field and phase boundary are well controlled, shorter focal lengths generate stronger Raman signals from the window material, potentially interfering with the Raman signal from the sample. Laser safety is also an issue, as is the possibility of lased-induced fouling on the window.

SUMMARY OF THE INVENTION

This invention resides in Raman immersion probe configurations adapted for use with optical apparatus operative to generate a collimated laser excitation beam and receive a counter-propagating collimated collection beam. A hollow immersion probe optic body conveys the counter-propagating beams to and from a distally sealed, signal-transmissive optical component such as a window, and wherein at least the distal surface of the sealed window is immersed, in contact with, or otherwise exposed to a sample volume. In accordance with the invention, as opposed to existing focusing schemes, the counter-propagating excitation and collection beams pass directly through the sealed optical component and into the sample volume in collimated form for Raman analysis thereof.

The Raman immersion probe may further include a sample chamber coupled to the distal end of the probe optic body, with one or more optical elements to reflect the counter-propagating beams. as examples, first- or second-surface mirrors may be used as retroreflectors. In preferred embodiments the sample chamber is baffled, thereby enabling a sample to flow therethrough. The sample chamber may be fixed or sealed to the immersion probe optic body but axially movable facilitating path length adjustment. The probe optic may be a disposable plastic probe optic to minimize cross-contamination between changes of the optic or components thereof. A wavelength standard material may be supported in the counter-propagating excitation and collection beams for calibration purposes.

The distally sealed, signal-transmissive optical component may penetrate a process vessel or conduit to analyze a sample contained within or flowing through the vessel or conduit. This embodiment may include a second signal-transmissive optical component penetrating the process vessel or conduit in axial alignment with the distally sealed, signal-transmissive optical component, such that the counter-propagating excitation and collection beams exit the process vessel or conduit through the second signal-transmissive optical component. A retroflector optical element may be used to reflect the counter-propagating excitation and collection beams back into the process vessel or conduit through the second signal-transmissive optical component in the opposite direction. Alternatively, the hollow immersion probe optic body forms part of a microscope objective.

The Raman immersion probes disclosed herein may adapted for use with a probehead probehead receiving laser excitation energy through a first fiber optic, and delivering Raman spectra to a spectrograph through a second fiber optic.

A Raman immersion probe constructed in accordance with the invention may comprise a first hollow tube with a proximal end in optical communication with such a probehead, and a distal end terminating in a sealed, signal-transmissive window. A second hollow tube, permanently, removably or moveably sealed to the first tube, includes a distal end incorporating a retroreflector. The second tube is preferably perforated between the window and the retroreflector, thereby creating a baffled sample volume within the second tube through which a sample flows. The counter-propagating excitation and collection beams pass directly through the window and into the sample volume and reflected by the retroreflector in collimated form for Raman analysis thereof.

The proximal end of the second tube may be moveably sealed to the distal end of the first tube to facilitate path length adjustment of the counter-propagating excitation and collection beams. One or both of the tubes and associated optics may be disposable to minimize cross-contamination between maintenance or replacement. The baffled sample volume may be disposed within a process vessel or conduit to analyze a sample contained within or flowing through the vessel or conduit. The probehead may also be coupled to a microscope objective. The first and second tubes are cylindrical, with the diameter of the second cylindrical tube being greater than the diameter of the first cylindrical tube. As with the other embodiments disclosed herein, the system may further including a wavelength standard material supported in the counter-propagating excitation and collection beams.

BRIEF DESCRIPTION OF THE DRAWINGS

FIG. 4 depicts a configuration of the invention applicable to a handheld device;

FIG. 5 shows a configuration of the invention for use in a process Raman application;

DETAINED DESCRIPTION OF THE INVENTION

Figure 1A:
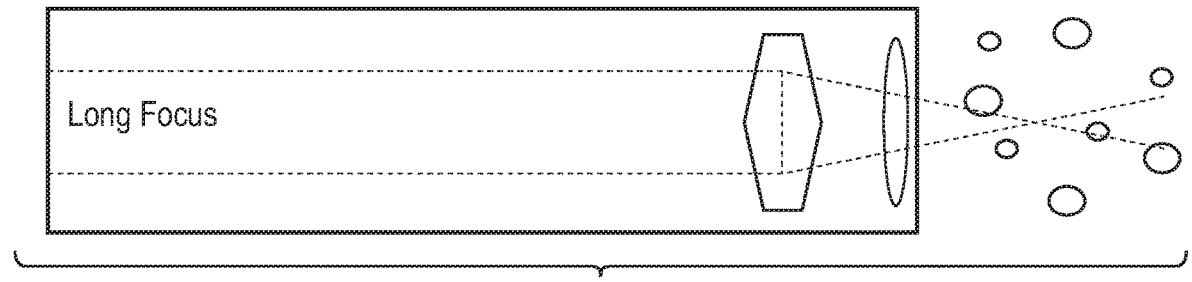
FIG. 1A shows how clear liquids allow for long focal lengths within a sample.
Figure 1B:
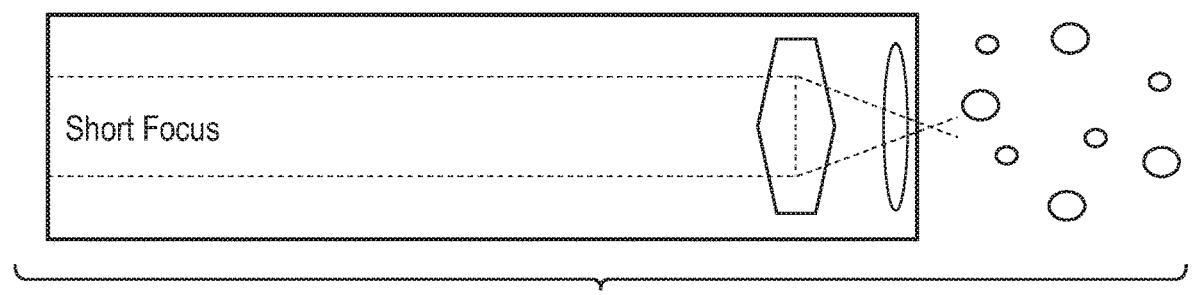
FIG. 1B illustrates optically moving the focal point and depth of field closer to the distal end of the probe to enhance throughput and signal to noise.
Figure 1C:
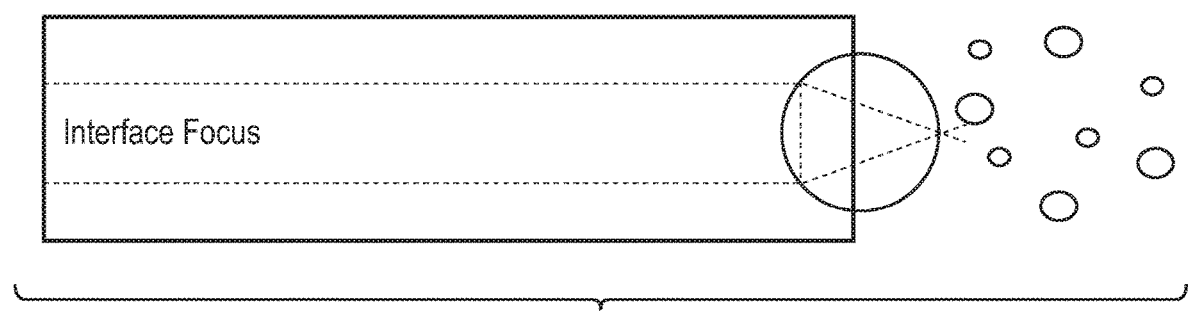
FIG. 1C depicts the use of a ball lens to facilitate focusing directly on the face (tangent) to the distal tip of the optic to address problems associates with slurries and solid samples.

In broad and general terms, the immersion Raman probes disclosed herein use collimated light as opposed to a diverging fiber bundle or lens-based focusing geometry to deliver and collect light to and from a sample. This approach eliminates problems associated with chromatic aberrations generated using a single lens design. Chromatic aberrations generated by a single lens create a different focal point for different wavelengths within the sample. The laser wavelength is collected at its focal point, while longer Raman wavelengths collected at this focal point will experience divergence when leaving the same lens operating as the collection lens. Raman scattered light collected at its own focal point will be lower in intensity but will be collimated as it leaves the collection lens. To avoid chromatic blur within the sample it is important to have the same focal point for the laser and the complete range of Raman wavelengths effectively keeping the collection efficiency and pathlength the same for the laser and the scattered Raman wavelengths.

Eliminating chromatic blur within the sample is critical for applications that generate increasing numbers of cells/particles during processes such as fermentation and crystallization. Chromatic blur renders such measurements sensitive to the effect of changing pathlengths and associated collection efficiency at different Raman wavelengths due to the scattering and absorption of the cells/particles.

With this invention, chromatic aberrations experienced by the optical system, and the effects of chromatic blur within the sample, can be eliminated through the use of a collimated light input and return geometry. Fiber optic-based immersion probes for life sciences, handheld probe optics for quality control (QC) applications, and directly inserted Raman probes for industrial process sensors in chemical and polymer industries can all benefit from this invention.

The Raman immersion probes described herein can be configured to collect Raman spectra from the full range of sample types including gases, liquids, slurries and solids. Using a large-diameter, collimated laser light input beam geometry and retro-reflector optics, the laser and Raman signal are both amplified by over a factor of three or more for gases and clear or partially transmissive liquids. Both reflected and longer-path transmission Raman signals can be collected simultaneously, and the reflected signal dominates if the sample becomes, or is, opaque.

The large diameter collimated laser light input beam geometry allows significantly higher power lasers to be used to generate stronger Raman signals without the potential hazardous safety issues associated with focusing higher powered lasers into the sample environment. For example, Nd:YAG lasers with output powers of over one watt can now be considered as viable laser candidates for generating Raman signals.

A focused laser input beam can potentially create window fouling resulting in a reduction in light transmission by the window and an unwanted Raman signal from the fouling material. The large diameter collimated laser light input beam geometries disclosed herein reduce this potential for laser induced fouling at the surface of the window. With a large-diameter collimated laser light input beam, the Raman signal/spectra from the window material is also reduced as compared a focused input beam geometry. This reduces the potential for interference between the Raman spectra from the window material and the Raman spectra from the sample material.

With a large-diameter collimated laser light input beam, a larger representative sample volume is analyzed, providing better precision and accuracy measurements from the sample material. By incorporating an extended path length and retro-reflector optic, an ideal sampling configuration can be achieved for liquid samples, even with small amounts of solids, making it ideal for research into for example nucleation, crystallization and fermentation experiments and processes.

The Raman signature from a window, or as part of the retroreflector, may be used to provide a reference signal from a substrate material such as sapphire. This, in turn, facilitates the measurement of sample turbidity or the effects of particle scattering in real time, as particles are created in the liquid sample for example during nucleation, crystallization and fermentation experiments. The reference substrate signature may also be used to determine the actual wavelength of the laser to determine if it has shifted the collected Raman spectra, allowing the laser line to be re-centered to the correct laser wavelength, thereby providing better precision and accuracy measurements for the sample material.

Using a large-diameter, collimated laser light input beam geometry provides representative sampling and, by incorporating a disposable plastic probe optic, Raman spectra can be collected by directly contacting solids or other types of samples for analytical or quality control purposes without cross contamination from different samples. In particular, the configurations disclosed herein allow Raman spectra to be collected from a full range of sample types including gases, liquids, slurries and solids.

Figure 2:
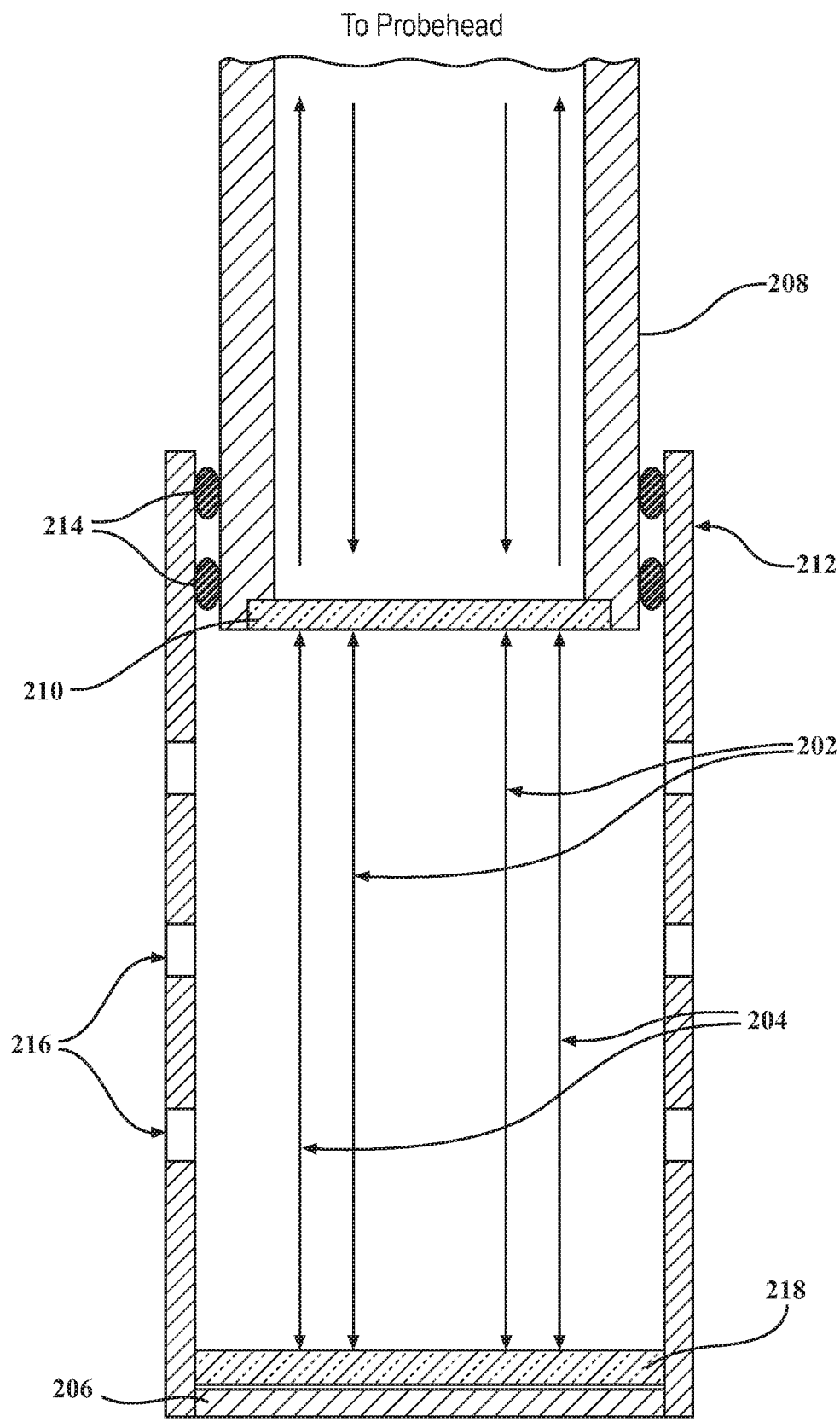
FIG. 2 shows a configuration of the invention for Raman spectroscopy using a large-diameter, collimated laser light input and large-diameter, collimated return beam in conjunction with a laser/Raman retroreflector.

The advantages and benefits of the Raman immersion probe designs detailed in the following diagrams are based on using a large diameter collimated input laser beam geometry, and returning scattered beam containing the Raman spectra. FIG. 2 shows a configuration of the invention for Raman spectroscopy using a large-diameter, collimated laser light input 202 and large-diameter, collimated return beam 204 in conjunction with a laser/Raman retroreflector 206. As mentioned, these larger diameters (i.e., (e.g. 1 mm, 3 mm, 6 mm dia.), provide the advantages listed above while improving safety due to reduced laser energy density.

This embodiment uses an immersion probe optic body 208 (i.e., a cylindrical tube constructed from stainless steel 326L or Hastelloy C-276). The distal end of the tube 208 terminates in a sealed window 210 of a material transmissive to wavelengths of interest, such as sapphire. Tube 208 may in turn be coupled to an outer tube 212 through O-rings 214 or other sealing mechanism, thereby facilitating an adjustable extension to set a required path length. Outer tube 212, also of stainless steel or Hastelloy, would include perforations so as to achieve a baffle arrangement facilitating the flow of a sample through the volume between window 210 and retroreflector 206.

The adjustable retroreflector 206 allows for the optimum pathlength to be set to accommodate processes that create an increasing volume fraction of particles from the start to the end of the process, e.g. crystallization or fermentation processes. Optionally, the system my further include a wavelength standard 218 such as diamond or calcium fluoride to act as a reference signal for turbidity measurements, for example.

Figure 3:
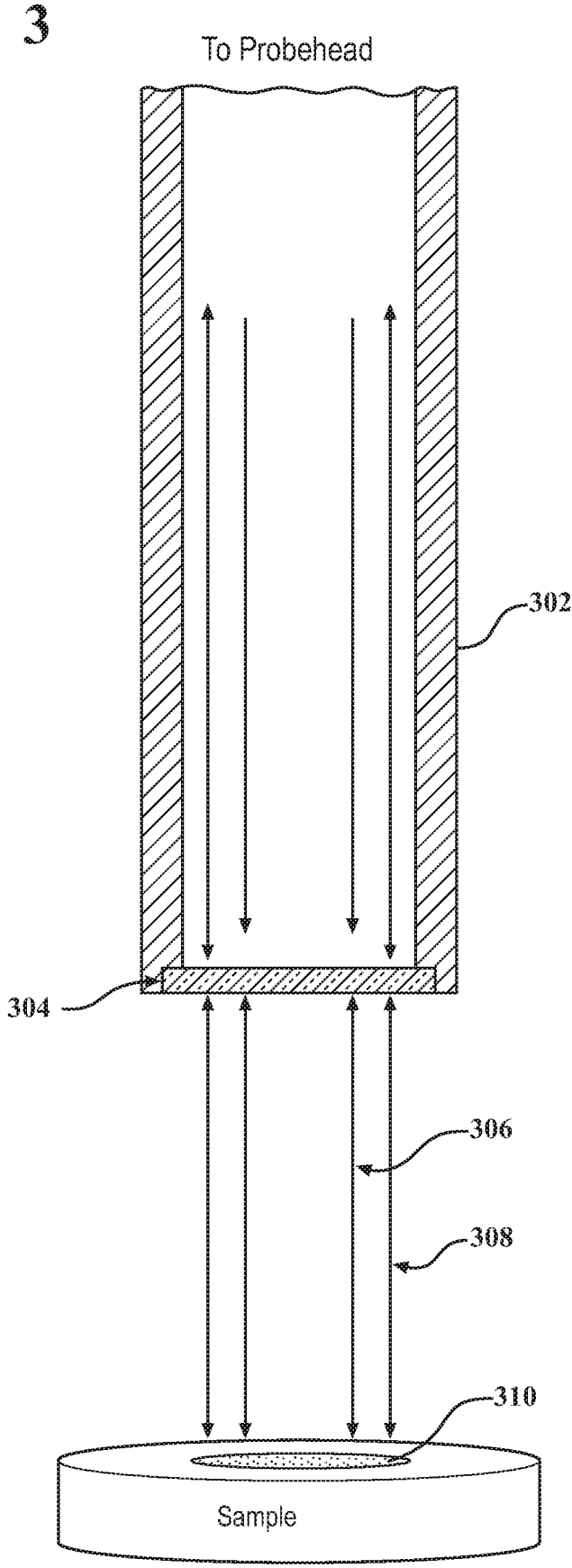
FIG. 3 illustrates an embodiment of the invention without an outer tube or baffle.

FIG. 3 illustrates an embodiment of the invention without an outer tube and baffle. As with the embodiment of FIG. 2, this configuration uses an optic body 302 terminating in a sealed window 304, with a sample spaced-apart from the window 304 at a desired distance. The sample in this case may be a solid.

This embodiment provides for a non-contact Raman probe with a collimated output avoiding sample-to-sample cross-contamination issues. As with the other embodiments described herein, the larger-diameter, collimated laser input 306 enables the use of higher-powered lasers with reduced probability of laser-induced damage. The larger-diameter, collimated Raman output signal 308 establishes a large spot 310 for representative sampling.

FIG. 4 depicts a configuration of the invention applicable to a handheld device. As with FIG. 3, this configuration provides a Raman probe optic for solids/liquids that also uses a large-diameter collimated laser input and returning scattered, large-diameter Raman signal. This embodiment uses a relatively this transparent window 402 enabling the distal surface of the window to be positioned adjacent the sample for averaged or representative sampling. Such representative sampling is important to accurately identify or measure the individual concentrations from multicomponent samples, while allowing for the use of a disposable probe optic to eliminate the likelihood of cross-contamination between different samples.

FIG. 5 shows a configuration of the invention for use in a process Raman application. This embodiment also features a probe optic 502 terminating in a sealed window 504, but wherein the sealed window 504 forms part of a port into a process pipe or vessel carrying a sample. A second sealed window 506 forms part of a second port in opposing relation to the first window 504. Beyond second window 506 there is disposed a retroreflector 508 operative to redirect counter-propagating excitation/collection beam 512 to and from laser source and spectrograph. Optionally, a diamond or other reference standard 510 may be disposed between the second window 506 and retroreflector 508. While retroreflector 508 and/or reference standard 510 my be located within the volume of the pipe/vessel, they are preferably located externally to ease replacement or maintenance.

Figure 6:
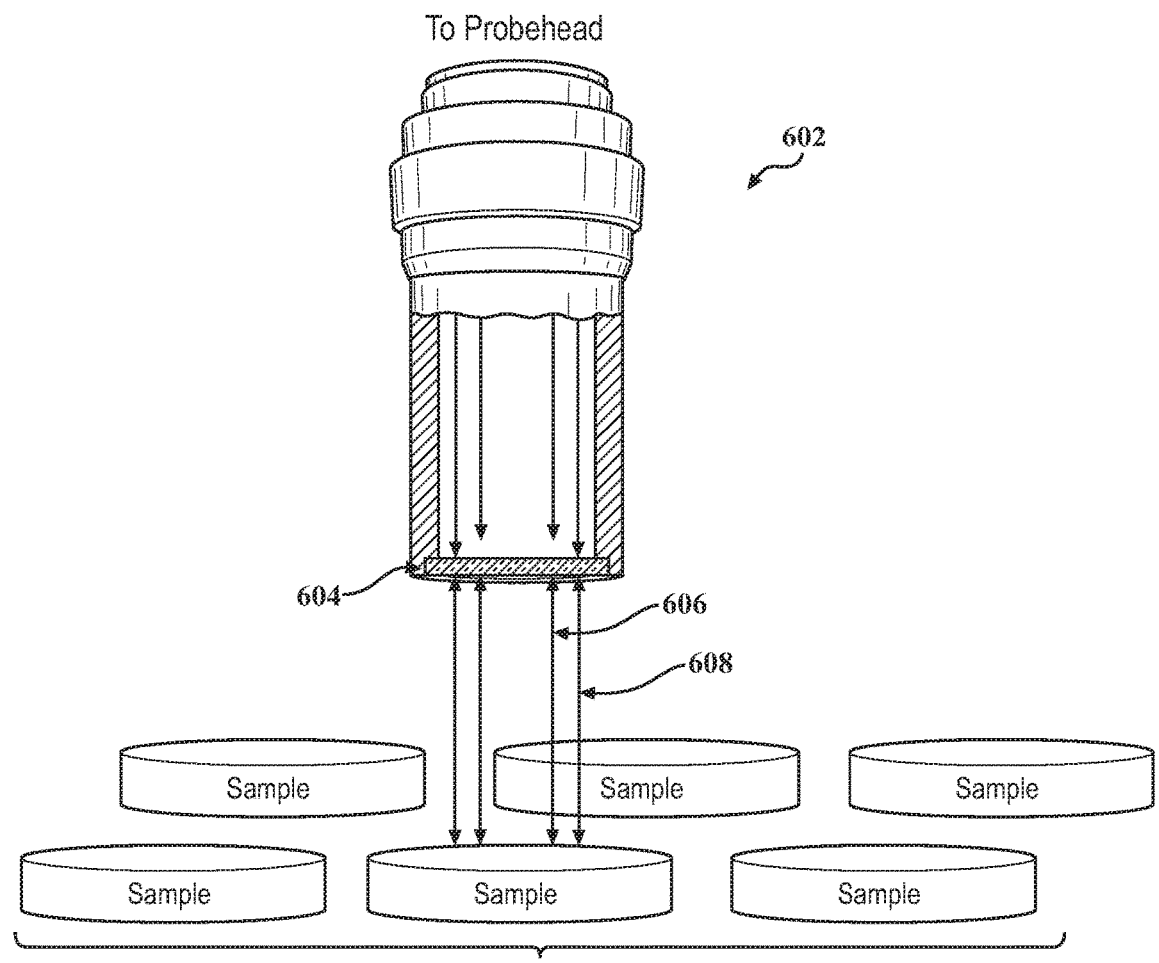
FIG. 6 depicts a Raman probe according to the invention adapted for use in conjunction with a microscope objective optic body having a flat sealed probe window supporting large diameter, collimated laser light input and return beam geometries.

FIG. 6 depicts a Raman probe according to the invention adapted for use in conjunction with a microscope objective optic body 602 having a flat sealed probe window 604 supporting large diameter, collimated laser light input and return beam geometries, 606, 608. The returning scattered, large-diameter, averaged Raman signal provides representative sampling to accurately identify/measure the individual concentrations from multicomponent samples. Accordingly, this embodiment is ideally suited for well-plate analysis of multiple samples.

Figure 7:
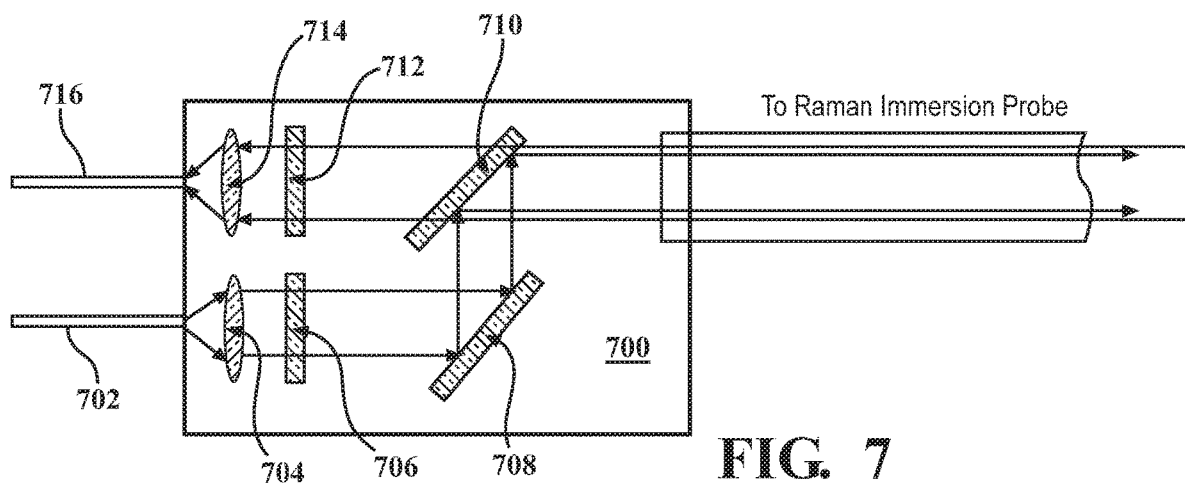
FIG. 7 illustrates a Raman probehead applicable to the various embodiments described herein.

FIG. 7 illustrates a Raman probehead applicable to the various embodiments described herein, with the understanding that other probeheads may be used so long as they generate a counter-propagating excitation/collection beam. Prior art examples of patented Raman probeheads may be found in U.S. Pat. No. 5,112,127 to Carrabba et al. and U.S. Pat. No. 5,377,004 December 1994 Owen et al., the teachings of which are incorporated herein buy reference.

An external laser (not shown) may connect to the probehead 700 through a length of fiber optic 702. Inside the probehead, an optical lens 704 is used to collimate the diverging laser output beam exiting from the end of fiber optic 702. A laser bandpass filter 706, positioned after the collimating lens 704, rejects unwanted fluorescence and Raman scattering generated in the fiber by the laser. The reconditioned laser output is directed onto a fold mirror 708 that directs the laser onto a beam combiner 710 that directs the laser beam into the Raman immersion probe and the path of the returning Raman signal.

The collimated laser energy and retuning Raman signal would ordinarily be focused into a sample by an optical lens located just inside of a sealed window. In contrast to this existing design, however, in the embodiments of the invention disclosed herein, focusing optics would be eliminated. Instead, the returning collimated Raman signal from the sample is transmitted by the beam combiner 710 and directed onto a narrow laser rejection filter 712 to remove unwanted scattered laser light, after which the Raman signal is then focused by an optical lens 714 onto outgoing fiber optic 716 that will then transport the Raman signal back to a spectrometer for analysis.

In summary, this invention provides a universal Raman probe design based on using a large diameter collimated laser light input beam geometry allows Raman spectra to be collected from the full range of sample types including gases, liquids, slurries and solids. By using a large diameter collimated light input beam, geometry chromatic aberrations generated by the single lens geometry are eliminated. The degree of divergence over the length of the immersion probe will determine if vignetting is an issue. The degree of divergence of the Raman scattered light arriving at the imaging lens in the probehead will determine if the full range of the Raman scattered light is being collected and imaged efficiently.

Eliminating chromatic blur within the sample is critical to avoid having different focal points for the laser and the complete range of Raman wavelengths, the focal point, pathlength and collection efficiency need to be same for the laser and the scattered Raman wavelengths. Eliminating chromatic blur within the sample is critical for applications that generate increasing numbers of cells/particles during the process (fermentation and crystallization processes), chromatic blur will make the measurement sensitive to the effect of changing pathlengths and associated collection efficiency at different Raman wavelengths due to the scattering and absorption of the cells/particles.

The use of a large diameter collimated light input beam geometry significantly higher power lasers can be used to generate stronger Raman signals without the hazardous safety issues associated with focusing higher powered lasers into the sample environment. A large diameter collimated light input beam geometry also allows significantly higher-power lasers can be used to generate stronger Raman signals without the potential problem of laser induced fouling at the surface of the window and the associated reduction in light transmission by the window and unwanted Raman signal from the fouling material due to using a focused laser design.

By using a large-diameter collimated light input beam geometry the Raman spectra from the window material is significantly reduced than for a focused input beam geometry. This reduces the potential for interference between the Raman spectra from the window material and the Raman spectra from the sample material. By using a large diameter collimated light input beam geometry a large and representative sample volume is analyzed providing better precision and accuracy measurements for the sample material. In addition, by using a large diameter collimated light input beam geometry and a retro-reflector optic the laser and Raman signal will be amplified by over a factor of 2 for gases and clear or partially transmissive liquids.

By using a large diameter collimated laser light input beam and incorporating an extended path length and retro-reflector optic an ideal sampling configuration can be set up for liquid samples with small amounts of solids making it ideal for research into for example nucleation, crystallization and fermentation experiments. By using a large diameter collimated laser light input beam incident upon a substrate with a strong Raman signature as part of the retroreflector the Raman signal from the substrate material (for example sapphire) can be used as a reference signal to enable the measurement of the sample turbidity or effect of particle scattering in real time as particles are created in the liquid sample for example during nucleation, crystallization and fermentation experiments.

Further, by using a large diameter collimated laser light input beam incident upon a substrate with a strong Raman signature located before or as part of the retroreflector the Raman spectra from the reference substrate material (for example sapphire) can be used to determine the actual wavelength of the laser and if it has shifted the collected Raman spectra can be re-centered to the targeted set laser wavelength providing better precision and accuracy measurements for the sample material.

Representative sampling is also made possible by using a large-diameter collimated laser light input beam incorporating a disposable plastic probe optic. Raman spectra can be collected by directly contacting solids/liquids or other types of samples for analytical or quality control purposes without cross contamination from different samples. This is an ideal option for use with handheld Raman devices were both improved laser safety and representative sampling is offered.

The invention claimed is:

1. A Raman immersion probe adapted for use with optical apparatus operative to generate a collimated laser excitation beam and receive a counter-propagating collimated collection beam, the probe comprising:
a hollow immersion probe optic body, and wherein the counter-propagating beams occupy the same space within the hollow probe optic body to and from a distally sealed, signal-transmissive optical component;
wherein the distal sealed optical component has a proximal surface and a distal surface, and wherein at least the distal surface of the sealed optical component is immersed in a sample volume; and
wherein the counter-propagating excitation and collection beams pass directly through the sealed optical component, into the sample volume, and back into the hollow immersion probe body in collimated form for Raman analysis thereof.

2. The Raman immersion probe of claim 1, wherein the optical component is a planar signal-transmissive window.

3. The Raman immersion probe of claim 1, further including a sample chamber coupled to the distal end of the probe optic body; and
wherein the sample chamber includes one or more optical elements to reflect the counter-propagating beams.

4. The Raman immersion probe of claim 3, wherein the sample chamber is baffled, thereby enabling a sample to flow therethrough.

5. The Raman immersion probe of claim 3, wherein the sample chamber is sealed to the immersion probe optic body but axially movable facilitating path length adjustment.

6. The Raman immersion probe of claim 1, wherein the probe optic is a disposable plastic probe optic to minimize cross-contamination between changes of the optic.

7. The Raman immersion probe of claim 1, further including a wavelength standard material supported in the counter-propagating excitation and collection beams.

8. The Raman immersion probe of claim 1, wherein the distally sealed, signal-transmissive optical component penetrates a process vessel or conduit to analyze a sample contained within or flowing through the vessel or conduit.

9. The Raman immersion probe of claim 1, further including a second signal-transmissive optical component penetrating the process vessel or conduit;
wherein the second signal-transmissive optical component is in axial alignment with the distally sealed, signal-transmissive optical component such that the counter-propagating excitation and collection beams exit the process vessel or conduit through the second signal-transmissive optical component; and
a retroflector optical element operative to reflect the counter-propagating excitation and collection beams back into the process vessel or conduit through the second signal-transmissive optical component in the opposite direction.

10. The Raman probe of claim 1, wherein the hollow immersion probe optic body forms part of a microscope objective.

11. A Raman immersion probe adapted for use with a probehead operative to generate a collimated laser excitation beam and receive a counter-propagating collimated collection beam, the probe comprising:
a first hollow tube having proximal and distal ends, and wherein the proximal end of the first tube is in optical communication with the probehead and the distal end of the first tube terminates in a sealed, signal-transmissive window;
a second hollow tube having proximal and distal ends, and wherein the proximal end of the second tube is sealed to the distal end of the first tube, and the distal end of the second tube a terminates in a retroreflector;
wherein the second tube is perforated between the window and the retroreflector, thereby creating a baffled sample volume within the second tube through which a sample flows; and
wherein the counter-propagating excitation and collection beams pass directly through the window and into the sample volume and reflected by the retroreflector in collimated form for Raman analysis thereof.

12. The Raman immersion probe of claim 11, wherein the proximal end of the second tube is moveably sealed to the distal end of the first tube to facilitate path length adjustment of the counter-propagating excitation and collection beams.

13. The Raman immersion probe of claim 11, wherein one or both of the tubes are disposable plastic tubes to minimize cross-contamination between tube changes.

14. The Raman immersion probe of claim 11, further including a wavelength standard material supported in the counter-propagating excitation and collection beams.

15. The Raman probe of claim 11, wherein the baffled sample volume is disposed within a process vessel or conduit to analyze a sample contained within or flowing through the vessel or conduit.

16. The Raman probe of claim 11, wherein the probehead forms part of a microscope.

17. The Raman probe of claim 11, wherein the first and second tubes are cylindrical.

18. The Raman probe of claim 17, wherein the diameter of the second cylindrical tube is greater than the diameter of the first cylindrical tube 1.

* * * * *